United States Patent [19]
Issigonis et al.

[11] 3,722,612
[45] Mar. 27, 1973

[54] CHAIN DRIVEN VEHICLES

[75] Inventors: Alec Arnold Constantine Issigonis, Edgbaston, Birmingham; Bernard Hooper, Wordsley, near Stourbridge, both of England

[73] Assignee: Norton Villiers Limited, Wolverhampton, England

[22] Filed: June 17, 1970

[21] Appl. No.: 46,916

[52] U.S. Cl. .................180/32, 180/33 A, 180/64 R, 280/275, 280/283
[51] Int. Cl. ........................B60k 5/12, B60k 5/06
[58] Field of Search......180/29, 30, 32, 33, 33 A, 35, 180/64; 248/9, 18, 8, 10; 123/192

[56] References Cited

UNITED STATES PATENTS

| | | | |
|---|---|---|---|
| 3,542,146 | 11/1970 | Hooper | 180/33 A |
| 1,420,498 | 6/1922 | Peters | 180/35 |
| 1,389,017 | 8/1921 | Stewart | 123/192 |
| 669,653 | 3/1901 | Morse | 180/33 |
| 2,583,499 | 1/1952 | Teegen | 180/33 X |
| 2,792,899 | 5/1957 | Piatti | 180/32 X |

FOREIGN PATENTS OR APPLICATIONS

1,189,881  3/1965  Germany..........................180/33 A

*Primary Examiner*—Benjamin Hersh
*Assistant Examiner*—John P. Silverstrim
*Attorney*—Kurt Kelman

[57] ABSTRACT

The specification discloses a chain driven motor cycle in which the driven road wheel is mounted on a swinging fork which is pivotally mounted on the motor cycle frame or power unit so that the fork cannot twist about an axis normal to its pivot axis. The power unit is pivoted to the frame and the balance of the moving masses of the power unit is such that the reciprocating masses are substantially unbalanced and cause the power unit to oscillate about its pivot axis, such oscillations being damped by resilient means between the power unit and frame. The power unit is preferably mounted at or adjacent its instantaneous center of rotation with respect to the out of balance forces produced by the reciprocating masses so that the impulsive forces caused thereby are substantially not transmitted to the frame. The invention is also applicable to snowmobiles.

3 Claims, 8 Drawing Figures

CHAIN DRIVEN VEHICLES

BACKGROUND OF THE INVENTION

This invention relates to chain-driven vehicles including a wheel driven by a chain entrained about driven and driving chain sprockets on the wheel and on a power unit respectively, the wheel being mounted in a pivoted fork which is connected by resilient suspension means to a vehicle frame which also carries the power unit. The invention is particularly applicable to motor cycles, by which we mean to include all steerable, two-wheeled, chain-driven vehicles in which the driven wheel is a road wheel; the invention may also be applied to tricycles having a driven road wheel. Furthermore, the invention is applicable to snowmobiles which are track-laying vehicles; in a snowmobile the driven wheel will drive the track.

It is an object of the invention to provide a simple but effective means for mounting the power unit and fork on the frame of the vehicle without unduly loading the frame and while damping the oscillations of the power unit.

SUMMARY OF THE INVENTION

According to the invention we provide a chain-driven vehicle comprising: a frame; a power unit carried by the frame and including an internal combustion, piston engine having a single cylinder or a number of side-by-side cylinders with their longitudinal axes in an axial plane and having a crankshaft; a driven wheel; a fork carrying said driven wheel for rotation about a first axis; first pivot means pivotally mounting the power unit on the frame for movement solely about a second axis; second pivot means pivotally mounting the fork for movement solely about a third axis except for working clearance; the fork being mounted on the frame or on the power unit said first and third axes being parallel and said second axis being substantially coincident with or substantially parallel to the third axis; a chain drive between the power unit and said driven wheel, said chain drive comprising a chain sprocket on the power unit rotatable about a fourth axis parallel to the first axis; balancing means carried by said crankshaft and which statically balances between 90 and 110 percent of the rotating masses (as hereinafter defined) of the engine only, resilient damping means interposed between the power unit and the frame resiliently to locate the power unit about said first pivot means and to damp oscillations of the power unit about the second axis, said damping means being located on or adjacent to either the longitudinal axis of the cylinder if there is only one cylinder or said axial plane if there is more than one cylinder, and resilient suspension means interposed between the frame and the fork and arranged to define opposite limit positions of the fork and thus of the first axis about said third axis, the third axis lying within and the second axis lying within or adjacent to, a triangle defined by the fourth axis and the limit positions of the first axis.

The combination of features set forth above has very desirable characteristics.

Firstly, the swinging fork, although pivotally mounted, is prevented from twisting about an axis perpendicular to its pivot axis. It is preferred that the swinging fork be mounted on a frame but the swinging fork may be mounted on the power unit. If the swinging fork is mounted on the frame then the first pivot means may include high-stiffness rubber bushes which introduce a small amount of resilience into the mounting of the engine.

Secondly, due to the arrangement of the balancing means, the engine will oscillate at low engine speeds and these oscillations will be damped by the resilient damping means. When we refer to the "rotating masses of the engine" we mean the proportion of the mass of the or each connecting rod which is obtained by weighing the bit end of the connecting rod, including the big end bearing, while the little end is freely suspended and assuming that the weight obtained is concentrated at the axis of the crank pin. The balancing means then comprises a weight which is applied diametrically opposite to the axis of the crank pin so as to balance between 90 and 110 percent of the out of balance produced by the mass of the big end portion of the or each connecting rod. The balancing means will be applied to a crank shaft which is itself balanced and the rotating masses of the engine are not defined as including the crank shaft itself, but only the big end portion of the or each connecting rod as explained above.

The reciprocating masses of the engine which, for the or each cylinder, comprise the piston, the gudgeon pin and the little end portion of the connecting rod are not specifically balanced and they will produce an out of balance force which has its major component acting along the cylinder axis. This out of balance force will cause oscillation of the power unit about the first pivot means and the second axis and these oscillations are damped by the resilient suspension means.

The suspension means are, therefore, arranged on or adjacent to the cylinder axis if the engine is a single cylinder engine or on or adjacent to said axial plane if the engine is a multi-cylinder engine. Preferably the resilient damping means are arranged on the axis or plane so that they are directly in line with the out of balance forces. Alternatively, the resilient damping means may be disposed about the axis or plane.

We have found that by using this arrangement it is possible to permit large amplitudes of oscillation of the power unit about the first pivot thus reducing the minimum engine speed at which damping of the out of balance forces becomes effective. These large amplitudes reduce the natural suspended frequency of the power unit. In known mounting systems it is impractical to provide large enough amplitudes of oscillation to reduce the natural suspended frequency to a point below the full operating speed range of the engine.

The relation between the second axis on which the power unit is pivoted, the third axis on which the swinging fork is pivoted and the fourth axis which is the axis of the driving chain sprocket is arranged so that during movement of the swinging fork about the third axis, due to road conditions, the first axis remains generally in line with the fourth axis so that there is no undue strain on the resilient suspension units or the chain.

Preferably, the second and third axes, i.e. the pivot axes of the fork and the power unit, are coincident. In a particularly preferred arrangement, the second, third and fourth axes are coincident.

Since the reciprocating masses of the engine are not balanced the polar load diagram obtained on a crank shaft bearing due to the out of balance forces from the reciprocating masses will be an elongated figure whose line of maximum length will substantially coincide with the cylinder axis in a single cylinder engine or with the axial plane in a multi-cylinder engine. The arrangement is preferably such that the second axis, i.e. the pivotal axis of the power unit, is arranged at, or adjacent to, the instantaneous center of rotation of the power unit in relation to the out of balance forces acting along the cylinder axis or the axial plane.

The center of percussion of the power unit will be obtained by producing a line through the center of gravity of the power unit and normal to the cylinder axis or the axial plane. Where this line intersects the cylinder axis or the axial plane will be the center of percussion of the power unit. There can now be calculated the position of the instantaneous center of rotation of the power unit by the formula:

$$L = (k^2 + a^2/a)$$

where $L$ is the perpendicular distance between the instantaneous center of rotation and the cylinder axis or axial plane, $a$ is the distance between the instantaneous center of rotation and the center of gravity and $k$ is the radius of gyration of the power unit about the center of gravity. As mentioned above, preferably the second axis passes through the instataneous center of rotation of the engine but we have found that advantageous results can be obtained if the second axis does not pass exactly through the instantaneous center of rotation but passes through a circle having as its center the instantaneous center of rotation and having a radius of not more than 10 percent $L$. Preferably the radius of the circle is not greater than 5 percent $L$ and in the most desirable arrangement the second axis will pass through the instantaneous center of rotation.

To determine the center of percussion and, therefore, the desired position for the second pivot axis, it is necessary to determine the center of gravity of the power unit. If the swinging fork is mounted on the frame then the center of gravity to be considered is that of the power unit itself, including any part of the exhaust system which is carried by the power unit. If, however, the swinging fork is pivotally mounted on the power unit allowance has to be made for the mass of the fork in calculating the center of gravity of the power unit. This allowance may conveniently be calculated by freely suspending the end of the fork which carries the driven wheel and weighting the other end of the fork, i.e. the end which is to be pivoted to the power unit, and then assuming that the weight so obtained acts at the third axis, i.e. the axis about which the fork is pivoted to the power unit.

The result of arranging the second pivot axis at the instantaneous center of rotation of the power unit is that the first pivot means is freed from impulsive forces due to the major components of the out of balance forces caused by the unbalanced reciprocating masses of the engine. An improved performance can, however, be obtained by locating the second pivot axis within said circle referred to. The circle will lie in a central plane which passes through the center of gravity of the power unit and will contain the longitudinal axis of the cylinder in a single cylinder engine or will be normal to the axial plane of a multi-cylinder engine.

It will be seen therefore, that the arrangement described above has the following advantages 1. The power unit and the fork are prevented from twisting relative to the frame axes perpendicular to their pivotal axes.
2. If the power unit is pivotally mounted at or adjacent advantages: its instantaneous center of rotation the major components of the out of balance forces due to the reciprocating masses of the engine are not transmitted to the frame.
3. By arranging the resilient damping means adjacent to the line of action of the out of balance forces the reaction at the first pivot means, i.e. the pivotal mounting of the power unit to the frame is controlled at a low value.

The damping means may comprise a single resilient assembly on said cylinder axis or axial plane as mentioned above or two or more assemblies disposed about the axis or plane. The or each resilient assembly may comprise first and second elements secured to the power unit and to the frame respectively and a mass of resilient material bonded to the first and second elements and stressed in shear during said oscillations. Preferably the resilient material is stressed solely in shear during said oscillations.

Preferably the invention is applied to a motor cycle in which case the driven wheel is a road wheel but as mentioned above it may be applied to other chain driven vehicles and in particular to a snowmobile in which the driven wheel drives an endless track.

BRIEF DESCRIPTION OF THE DRAWINGS

The invention will now be described in detail by way of example with reference to the accompanying drawings in which:

FIG. 6A is a diagrammatic side elevation of a motor cycle constituting a third embodiment of the invention, and FIG. 6B is a diagrammatic side elevation of a motor cycle constituting a fourth embodiment of the invention.

DESCRIPTION OF THE PREFERRED EMBODIMENTS

Figure 1A:
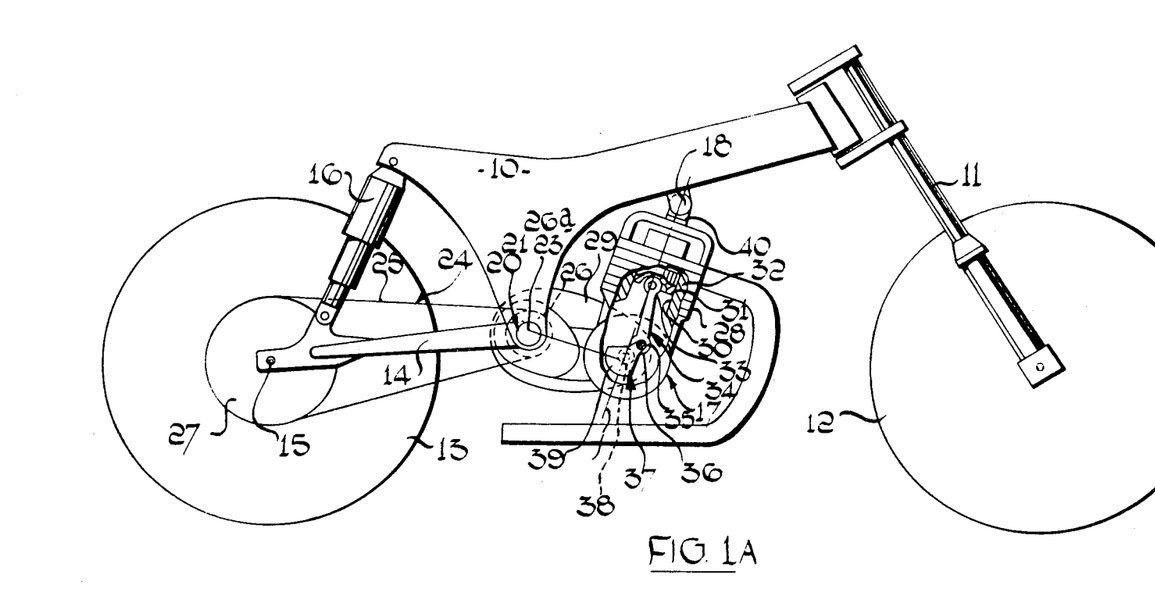
FIG. 1A is a diagrammatic side elevation of a motor cycle constituting a first embodiment of the invention.

Referring first to FIG. 1A, the motor cycle shown in that figure comprises a frame indicated generally at 10 and which is shown as being formed of metal pressings and which either contains a petrol tank or may form the petrol tank. However, a more conventional tubular frame may be used if desired. At the front, the frame carries the usual pivoted front forks 11 which in turn carry the front road wheel 12. The rear road wheel 13 is driven and is carried by a fork 14 which is pivoted at its forward end to the frame as will be described below. The wheel 13 is rotatable about a first axis 15 and resilient suspension means of conventional construction indicated at 16 are interposed between the fork and the frame.

The frame also carries a power unit indicated generally at 17 which is pivoted to the frame in a manner which will be described below and which is located about its pivot axis by resilient means 18.

Figure 2:
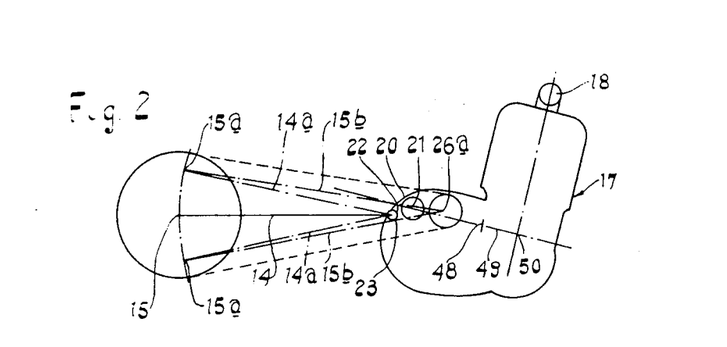
FIG. 2 is a diagram illustrating the relation between the first, second, third and fourth axes, the first and second pivot means and the centers of percussion and instantaneous rotation.

Referring to FIG. 2, this shows diagrammatically that the power unit 17 is pivoted by first pivot means 20 about a second axis 21 which is parallel to the first axis 15, the first pivot means 20 being interposed between the power unit 17 and the frame 10. The fork 14 is pivotally mounted by second pivot means 22 about a third axis 23, the second pivot means being interposed between the fork and the frame and the third axis being parallel to the axis 15. In the example shown in FIG. 1A, the second and third axes are coincident.

A chain drive 24 extends between the power unit 17 and the driven wheel 13 and comprises a chain 25 entrained around a driving sprocket 26 on the power unit and a driven sprocket 27 on the wheel 13.

Figure 4:
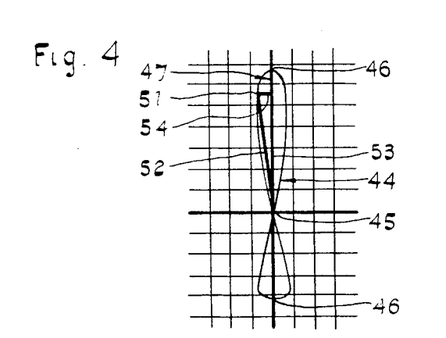
FIG. 4 is a polar load diagram of a single cylinder engine in which only the rotating masses are balanced 100 percent.

The driving sprocket 26 is rotatable about a fourth axis 26a which is parallel to the axes 21, 23 and 15 and is shown in FIG. 1A as being coincident with the axes 21 and 23 although this is not necessary as will be apparent from the description of FIG. 4 which follows.

The first pivot means 20 is arranged so that the sole permitted movement of the power unit 17 is a pivotal movement about the second axis 21 except for working clearance. Similarly, the second pivot means 22 is arranged so that the sole permitted movement of the fork 14 relative to the frame 10 is a pivotal movement about the third axis 23 except for working clearance. The fork 14 may be mounted on the frame or on the power unit.

The resilient suspension means 16 allow the fork 14 to pivot about the axis 23 between limit positions indicated by the lines 14a. The corresponding limit positions of the first axis 15 are indicated by the points 15a. The second and third axes 21 and 23 should must lie within the triangle defined by the fourth axis 26a and the lines 15b which extend between the fourth axis 26a and the limit positions 15a of the first axis 15. This arrangement of the axes is necessary to minimize the variation of chain tension during movement of the rear suspension swinging fork and also to minimize the displacement of the power unit about the first pivot during braking and acceleration.

The power unit 17 comprises an internal combustion piston engine 28 rigidly secured to a gearbox 29. In FIG. 1A the engine is shown as a single cylinder engine having a cylinder 30 in which reciprocates a piston 31. The piston carries a gudgeon pin 32 to which the small end 33 of the connecting rod is connected to a crank pin 36 on the crankshaft 37 mounted in main crankshaft bearings 38. Balancing means 39 are secured to the crankshaft.

Figure 3:
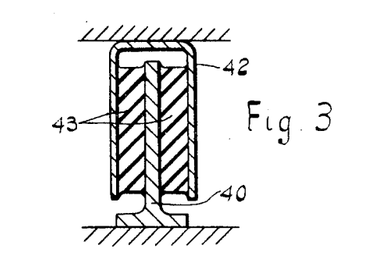
FIG. 3 is a section through a resilient assembly forming the resilient damping means.

The resilient assembly 18 comprises a first element 40 secured to the power unit, a second element 42 secured to the frame and two discs of resilient material 43 interposed between the elements 40 and 42 and bonded to the elements. It will be seen that the element 42 is of U-shape and the element 40 is a blade which is received between the limbs of the U. The resilient material 43 which may be synthetic rubber is under some axial compression but it will be seen that as the power unit 17 oscillates about the second axis 21 the resilient material will be stressed solely in shear.

Referring now to FIG. 4, this shows the polar load diagram which is obtained when the balancing means 39 are such that they balance 100 percent solely the rotating masses of the engine. As mentioned above, the big end portion of the connecting rod 34 is included in the rotating masses and the small end portion is included in the reciprocating masses. The relative sizes of the portions may be determined as described above.

The polar load diagram is indicated generally at 44 and has its origin at 45 which coincides with the axis of the crankshaft 37. It will be seen that the maximum length of the diagram between the points 46 is over five times the maximum width of the diagram measured perpendicular to the line 47 joining the points 46. This line is directed along the longitudinal axis of the cylinder and the arrangement is such that, referring to FIG. 2, the axis 21 is at the instantaneous center of rotation of the power unit for forces acting along the cylinder axis, i.e. along the line 47. Thus, referring to FIG. 2, the center of gravity of the power unit is indicated at 48 and a line 49 passes through the second axis 21 which is at the instantaneous center of rotation of the power unit relative to a center of percussion 50 lying on the longitudinal axis of the cylinder and, therefore, on the line 47. The center of gravity 48 of the power unit is determined as described above making no allowance for the fork 14 since it is pivotally mounted on the frame 10.

The result of this arrangement is that for an impulsive force due to the reciprocating masses of the engine, for example a force corresponding to the point 51 in FIG. 4 and represented by a line 52, may be resolved into a force 53 along the line 47 and a force 54 which acts through the origin 45 and perpendicular to the line 47. It will be seen that the component 53 which passes through the center of percussion 50 is considerably greater than the component 54 and since the component 53 passes through the center of percussion 50 there will be no impulsive loads due to this component on the first pivot means at the axis 21 because the axis 21 passes through the instantaneous center of rotation of the power unit. It follows that these major components of the impulsive forces will not be transmitted to the frame through the first pivot means 20 because the latter is located at the instantaneous center of rotation.

It will be seen that the resilient means 18 is intersected by the line 47 and that therefore a greater part of the reaction provided by the frame for the power unit as a result of the out of balance forces is taken by the resilient assembly rather than by the first pivot means 20. Since the resilient means 18 is on the line 47 it will not be subjected to torsion and the resilient material 43 will be stressed substantially only in shear.

Figure 1B:
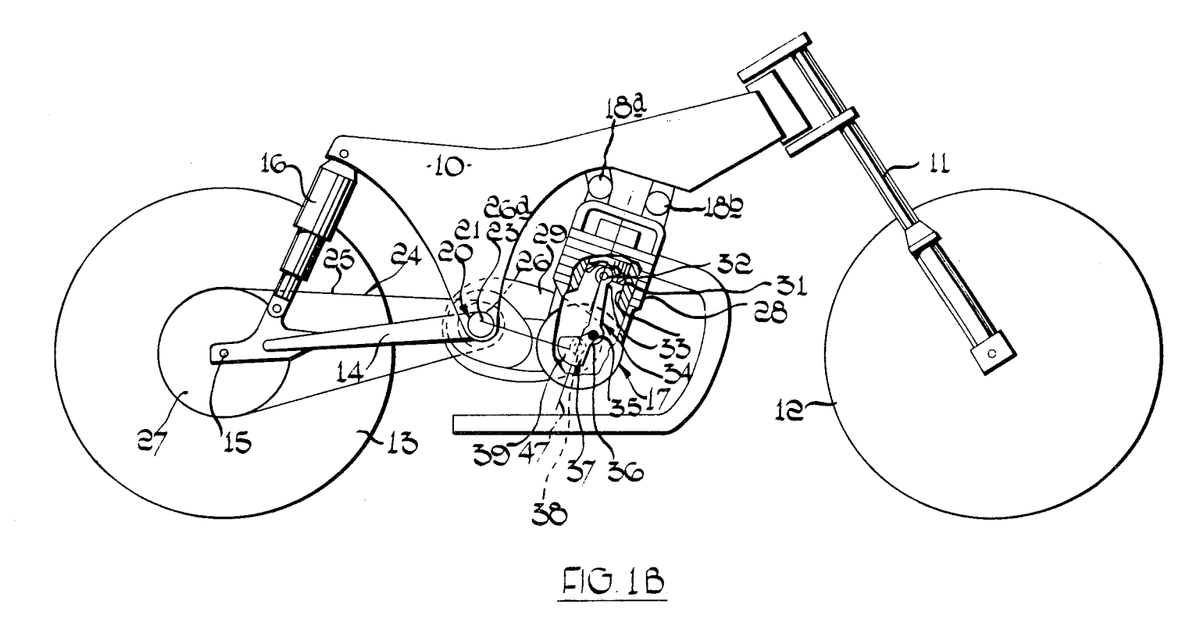
FIG. 1B is a diagrammatic side elevation of a motor cycle constituting a second embodiment of the invention.

If desired, however, the resilient assembly 18 could be replaced by, for example, two similar resilient assemblies located on either side of the line 47, for example at 18a and 18b as shown in FIG. 1B, in such a manner as to prevent their being subjected to any torsion during oscillation of the power unit. The motor cycle shown in FIG. 1B is, apart from the above difference, identical to that shown in FIG. 1A. It will also be seen from FIG. 1B that the perpendicular distance between the center of each resilient assembly and the line 47 is considerably less than the perpendicular distance between the second axis 23 and the line 47 so that the resilient assemblies will take a major part of the reaction due to the out of balance forces of the reciprocating masses of the engine.

It is an essential feature of the invention that the reciprocating masses of the engine are left substantially unbalanced.

Figure 5:
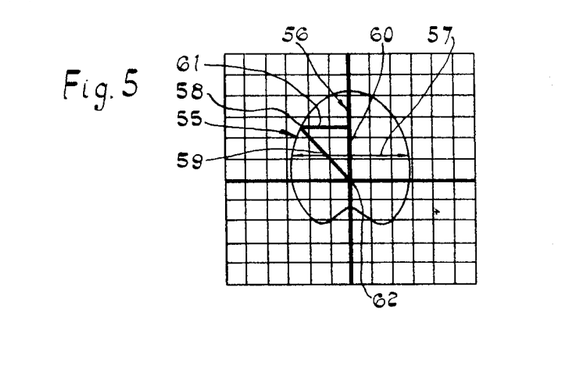
FIG. 5 is a polar load diagram for a single cylinder engine but showing the result when 50 percent of the reciprocating masses are balanced.
Figure 9:
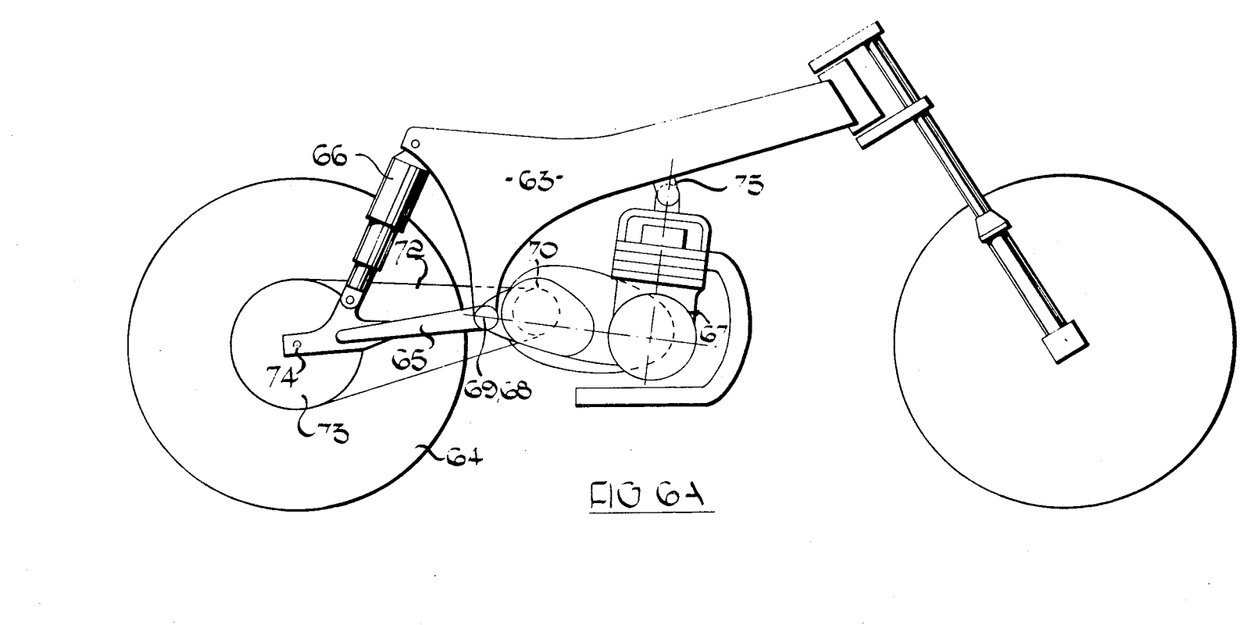
Figure 9B:
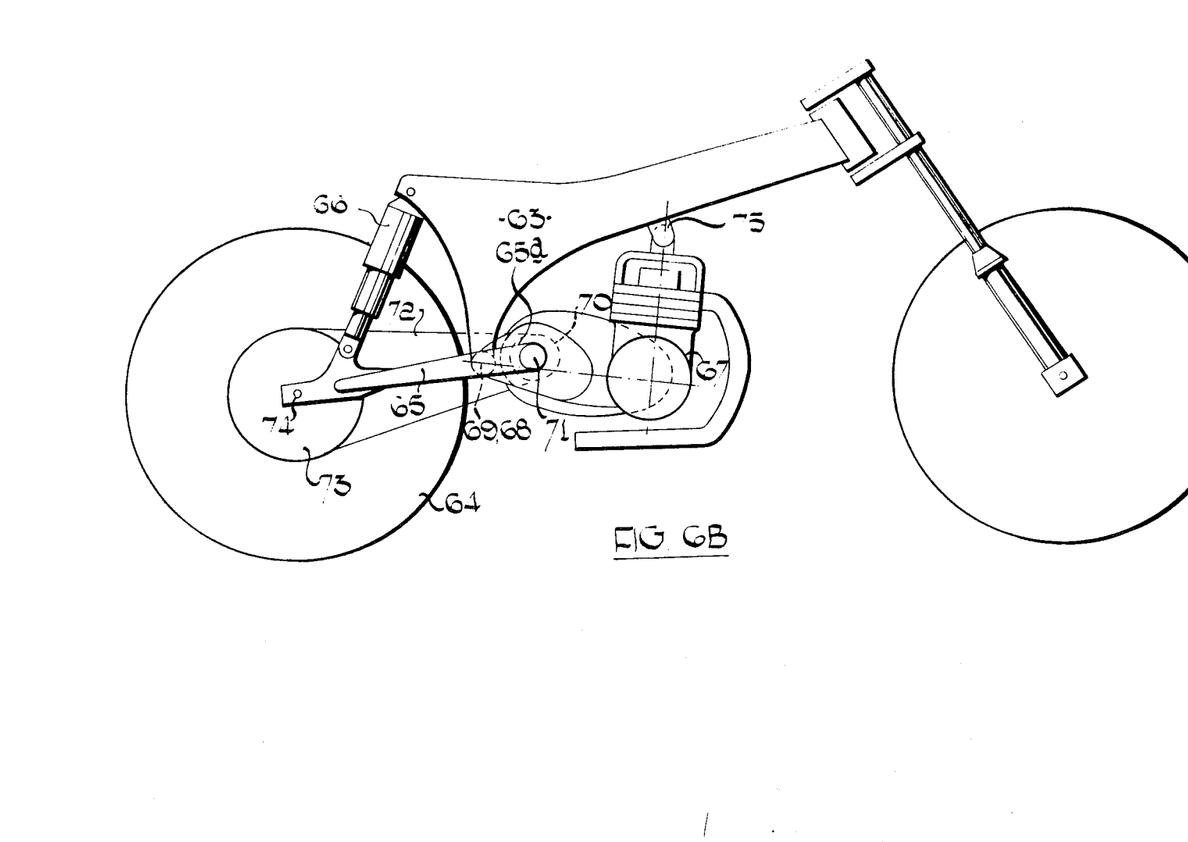

In this connection reference is made to FIG. 5 which shows a polar load diagram for a single cylinder engine wherein the balancing means such as 39 balance 50 percent of the reciprocating masses of the engine. It will be seen that the length of the diagram 55 shown in FIG. 5 and indicated by the line 56 is substantially equal to the maximum width indicated by the line 57. Thus, if the balance of the reciprocating masses was 50 percent as shown in FIG. 5, although the forces parallel to the line 56 would pass through the center of percussion in an arrangement similar to FIG. 1 and, therefore, there would be no impulsive loads on the first pivot means in respect of these forces, there would be considerable impulsive loads due to the forces corresponding to the line 57. In other words, if one resolved a force corresponding to the point 58 on the diagram, which force is indicated at 59, there would be a component 60 along the line 56 and a component 61 through the origin 62, and it will be seen that the components 60 and 61 are substantially the same order of magnitude. In FIG. 1, the second and third axes 21 and 23 are coincident with the fourth axis 26a of the chain sprocket 26 but this, although desirable, is not essential.

Thus, referring to FIG. 6A, this shows an arrangement in which the power unit and the fork are pivoted about coincident axes to the frame but the driving chain sprocket is pivoted about a different axis. In FIG. 6A, the frame is indicated at 63, the rear driven wheel at 64, the fork at 65 and the resilient suspension means between the fork and frame at 66. A power unit 67 is pivoted to the frame about a second axis 68 which is coincident with a third axis 69 about which the fork 64 is pivoted to the fork. The driving chain sprocket is indicated at 70 and is rotatable about a fourth axis 71. The chain sprocket 70 drives a chain 72 which drives a sprocket 73 on the wheel 64 which rotates about a first axis 74.

The relation between the various axes 68, 69, 71 and 74 is as described in relation to FIG. 1A. In FIG. 6A, the second and third axes 68 and 69 are on a line joining the first and fourth axes 74 and 71 when the fork 65 is in its mid position.

The axis 68 is the instantaneous center of rotation of the power unit 67 in the same manner that the axis 21 is the instantaneous center of rotation of the power unit 17. The swinging fork 65 is pivoted directly to the frame 63 and, therefore, there is no need to make any allowance for said fork when calculating the center of gravity of the power unit 67. The arrangement of resilient means 75 for the power unit and the balance of the power unit are all as described in relation to FIG. 1A.

In a further embodiment shown in FIG. 6B, the fork 65 is extended as indicated at 65a so that instead of being pivoted to the frame, it is pivoted about the fourth axis 71, i.e. the axis of the driving chain wheel 70. The motor cycle shown in FIG. 6B is, apart from the above difference, identical to that shown in FIG. 6A. Since, in this case, the swinging fork is pivoted directly to the power unit, an allowance will have to be made for the swinging fork in calculating the center of gravity of the power unit and such allowance may be made as described above. In this latter arrangement the pivotal mountings of the fork and of the power unit will be such that the only permitted movement of each of them is a pivotal movement about their respective pivot axes except for working clearance.

Although it is preferred that the power unit is pivoted about the instantaneous center of rotation, we have found that advantageous results can be obtained if the second axis about which the power unit is pivoted to the frame is within the circle having a radius no greater than 10 percent of the distance between the instantaneous center of rotation and the center of percussion.

It will be seen from the foregoing that the invention provides a simple and convenient means for mounting a driven wheel in a swinging fork and driven by a power unit, the whole being mounted on a frame, so that the frame is insulated from the worst effects of the impulsive forces produced by the reciprocating masses of the engine, and the pivotal mounting of the power unit is relieved of said impulsive forces.

We claim:

1. A chain-driven vehicle comprising:
   a frame;
   a power unit carried by the frame and including an internal combustion, piston engine having a cylinder and a crankshaft;
   a driven wheel;
   a fork carrying said driven wheel for rotation about a first axis;
   first pivot means pivotally mounting the power unit on the frame for movement solely about a second axis except for working clearance;
   second pivot means pivotally mounting the fork for movement solely about a third axis except for working clearance;
   the fork being mounted on one of the frame and the power unit;
   the first, second and third axes being mutually parallel and parallel to the crankshaft axis;
   a chain drive between the power unit and said driven wheel, said chain drive comprising a chain sprocket on the power unit rotatable about a fourth axis parallel to the first axis;
   balancing means carried by said crankshaft and which statically balances between 90 and 110 percent of the rotating masses of the engine only;
   resilient damping means interposed between the power unit and the frame resiliently to locate the power unit about said first pivot means and to damp oscillations of the power unit about the second axis, said damping means being adjacent to an axial plane containing the longitudinal axis of the crankshaft; and resilient suspension means interposed between the frame and the fork and arranged to define opposite limit positions of the fork and thus of the first axis about said third axis, the second and third axes lying within a triangle defined by the fourth axis and the limit positions of the first axis and the second axis passing through an imaginary circle lying in a central plane which contains the center of gravity of the power unit and is normal to said axial plane, the center of such circle being a point such that $$L = (k^2 + a^2/a)$$

where $L$ is the perpendicular distance between the point and said axial plane, $a$ is the distance between the point and the center of gravity and $k$ is the radius of gyration of the power unit about the center of gravity, the radius of said circle being not greater than 10 percent of $L$.

2. A vehicle according to claim 1 wherein the radius of said circle is not more than 5 percent of $L$.

3. A vehicle according to claim 1 wherein said second axis passes through said point.

* * * * *